Jan. 5, 1937.   R. E. DAY   2,066,613

PISTON

Filed March 1, 1926

INVENTOR
Ray E. Day.
BY
Dike, Calver & Gray
ATTORNEYS.

Patented Jan. 5, 1937

2,066,613

UNITED STATES PATENT OFFICE 2,066,613

PISTON

Ray E. Day, Seattle, Wash.

Application March 1, 1926, Serial No. 91,407

4 Claims. (Cl. 309—11)

My invention relates to improvements in pistons and an object of my invention is to provide a piston of light weight material, having a relatively high coefficient of expansion and adapted for use in an engine cylinder having a lower coefficient of expansion, which piston is constructed so that the diametrical expansion due to heat of those portions of the piston that bear against the cylinder wall is minimized or entirely neutralized or even rendered negative if desired, thereby making it practical to fit the piston to an engine cylinder with a minimum amount of clearance.

A more specific object is to provide a piston of light weight material, as aluminum or aluminum alloy, said piston embodying a piston head, and having slipper sections forming thrust faces at the sides of the piston and having means connecting each thrust face with the piston head at different points for supporting the thrust face and for tending to move the slipper section inwardly without distorting the shape of the same in response to expansion of the piston head.

Other and more specific objects will be apparent from the following description taken in connection with the accompanying drawing.

Figure 1:
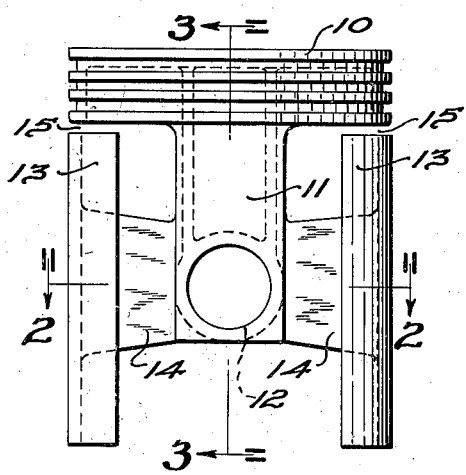

In the drawing Figure 1 is a view in elevation of a piston construction embodying my invention.

Figure 2:
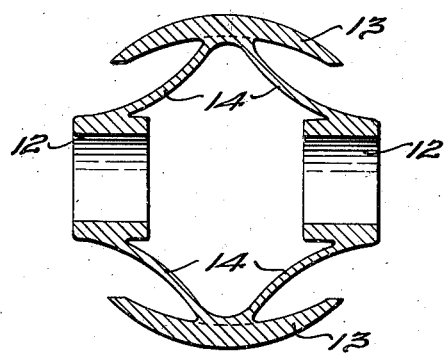
Figure 3:
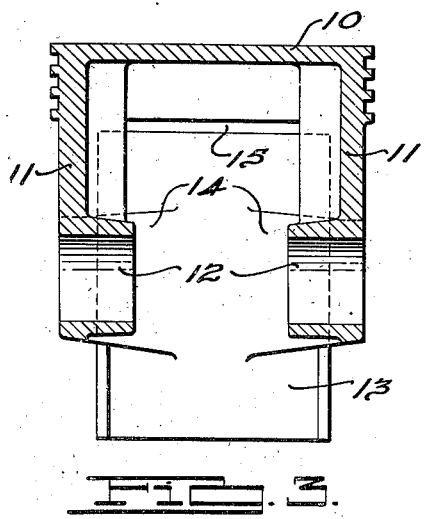

Figs. 2 and 3 are sectional views of the same on broken lines 2—2 and 3—3 of Fig. 1.

Figure 4:
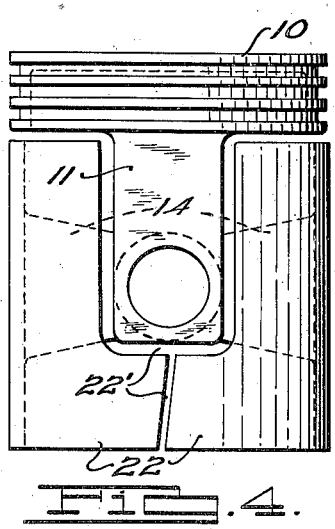

Fig. 4 is an elevation of a piston showing the slipper sections extending substantially all of the way around the piston.

Like reference numerals designate like parts throughout the several views.

In the construction of pistons for internal combustion engines it is highly desirable that the pistons be made of metal that is light in weight, strong and possessed of high heat conductivity. At the present time aluminum and aluminum alloys are extensively used. One serious objection to the use of aluminum and its alloys in piston construction is due to the fact that the co-efficient of thermal expansion of aluminum is substantially higher than that of the iron from which engine cylinders are ordinarily made. This makes it necessary in fitting the pistons to the cylinders to allow a relatively great amount of clearance between the skirt or slipper sections of the piston and cylinder walls. This relatively great clearance is liable to result in piston slap when the engine is running cold or when the thermal conditions are such that the maximum clearance is present. On the other hand if not enough clearance is allowed, then, when the engine becomes very hot the piston skirts may expand against the cylinder walls resulting in seizure, with consequent damage to the pistons and cylinders. In ordinary practice the piston head is given ample clearance for expansion purposes.

In my present invention I provide a piston of light weight material in which the slipper or skirt sections at the sides of the piston, that take the side thrust, are connected with the piston head in such a manner as to minimize or entirely neutralize any outward movement or diametrical expansion of said slipper sections due to heat, the movement produced by expansion of the piston head causing the mechanism that is connected with the slipper sections to tend to draw said slipper sections inwardly without distorting their shape.

In the accompanying drawing, Figs. 1, 2, and 3, show a piston embodying a cup shaped head 10 connected by depending integral, spaced apart supports 11 with wrist pin bosses 12 of the usual form. The piston is provided on the sides at right angles to the wrist pin bosses 12 with two oppositely disposed slipper sections 13 that are each connected with the wrist pin bosses by two or more divergent struts 14, and that afford thrust faces for taking the side thrust due to eccentricity of the crank shaft. The points of connection of the struts 14 with the slipper sections 13 is necessarily closer together than the points of connection of said struts with the wrist pin bosses so that when said wrist pin bosses are moved apart the struts will tend to draw the slipper sections inwardly. The distance between the points of connection of the two supports 11 with the piston head 10 will determine the amount of movement that will be produced between the two wrist pin bosses and said distance may be varied in the construction of the piston. The connection of the wrist pin bosses with the slipper sections is necessarily made in such a manner that the shape of the slipper sections will not be distorted by the comparatively slight movements of the wrist pin bosses. Slots 15 separate the slipper sections 13 from the piston head 10.

The amount of movement which the struts will tend to impart to the slipper sections by a given movement of the wrist pin bosses will vary in proportion to the angle of divergence between the struts that connect with the respective wrist pin bosses.

As shown in Fig. 2 the struts 14 connecting the slipper sections with the wrist pin bosses are curved, said curved struts having a tendency, as above stated, to move the slipper sections inwardly when the wrist pin bosses are moved apart. In addition, since said struts are somewhat resilient due to their curved form they may yield slightly as may be desirable under certain conditions. With reference to this embodiment of the invention, each diagonal strut 14, which extends in diverging relation from the skirt section or slipper to one of the bosses, is bowed in a region located a substantial distance inwardly from its point of juncture with the skirt, and in the illustrated example the struts are shown, by way of example, as bowed throughout the major portion of their breadth. This feature, i. e. the bowing of the struts, has important advantages in improving the operation of the piston under all conditions of engine operation, particularly under conditions when the entire piston heats up to relatively high temperatures and the toggle action of the struts is ineffective to control the diameter of the skirt. In this embodiment it is also preferred that at least a substantial portion of each strut 14 in its breadth where it joins or merges into the boss 12 extends at a relatively flat angle transversely with respect to the axis of the pin bosses, this angle, as shown, being less than forty degrees.

As a consequence of the improved construction, it will be seen that the diverging arrangement of the struts permits a predetermined control of the skirt diameter as a consequence of the toggle action exerted by the struts tending to draw the thrust faces inwardly when said bosses tend to move apart upon thermal expansion of the head, and the curvature or bowing of said struts, aided by the described angularity thereof, provides sufficient flexibility or yieldability so that upon failure of said struts to control the skirt diameter, such as by reason of excessive heating of the piston, said struts will flex or bend upon expansion of said skirt against the cylinder wall. Seizure and scoring of the piston under such conditions are greatly minimized.

The piston shown in Fig. 4 is similar to the piston disclosed in the preceding figures except that the skirt or slipper sections 22 of the same extend farther around the sides of the piston and are separated from each other and from the wrist pin supports 21 by narrow slots 22'.

I have shown a pair of struts connecting each slipper section with the wrist pin bosses but, if desired, more than one pair may be so connected with each slipper section.

The operation of my piston is as follows:

In installation, the slipper sections may be fitted closely within the cylinders so that the piston will run smoothly and quietly and without piston slap when the engine is cold. As the piston becomes heated by the operation of the engine all parts of the piston will expand by heat faster than the iron cylinder of the engine will expand. The expansion of the piston head will be the greatest and said piston head expansion will move the wrist pin bosses or supports to which the struts are connected apart slightly. At the same time the slipper sections of the piston will also expand but this expansion will be compensated for by the tendency of the struts to move the slipper sections inwardly as the inner ends of said struts are moved apart. By varying the angle between the struts as hereinbefore described the movement apart of the members that support the inner ends of the struts, due to expansion of the piston head, may be made to partially or entirely counteract expansion of the struts and slipper sections or may even be made to draw the slipper sections inward slightly as the piston becomes heated. If only one slipper section is connected to the wrist pin bosses by convergent supports and the other slipper section is otherwise supported the expansion of the thrust faces of the piston may be greatly minimized and beneficial results obtained.

It is convenient to connect the struts to the wrist pin bosses but it will be understood that said struts may be connected directly with the piston head or with any suitable supports that extend downwardly from, and are subject to the expansion of the piston head.

If desired the supports that connect the wrist pin bosses with the piston head may be made so that they will yield slightly if subjected to more than the usual strain.

In some constructions I prefer to proportion the strength of the several parts so that expansion of the piston head up to a predetermined amount will tend to draw the slipper sections inwardly but further expansion of said head will be taken up in other ways and will not produce any further inward movement of the slipper sections.

The foregoing description and accompanying drawing clearly disclose a preferred embodiment of my invention but it will be understood that this disclosure is merely illustrative and that such changes and variations in this piston may be made as are within the scope and spirit of the following claims.

I claim:

1. A piston for use in an engine cylinder comprising a head, two boss carrying supports extending downwardly from opposite sides of said head, coaxial piston pin bosses carried by said supports, a skirt constructed to form arcuate thrust faces at opposite sides of the piston between said boss carrying supports, a pair of struts connecting each thrust face with said supports, each pair of struts extending in diverging relation from the skirt to said supports and each strut being bowed throughout a substantial portion of its breadth, the skirt being supported from the head entirely through the medium of said pairs of struts, the diverging arrangement of the struts permitting a predetermined control of the skirt diameter as a consequence of a toggle action exerted by the struts tending to draw the thrust faces inwardly when said bosses tend to move apart upon thermal expansion of the head, and the bowing of said struts providing sufficient flexibility so that upon failure of said struts to control the skirt diameter by reason of excessive heating of the piston said struts will flex upon expansion of said skirt against the cylinder wall.

2. A piston for use in an engine cylinder comprising a head, two boss carrying supports extending downwardly from opposite sides of said head, coaxial piston pin bosses carried by said supports, a skirt constructed to form arcuate thrust faces at opposite sides of the piston between said boss carrying supports, a pair of diagonal struts extending in diverging relation from a thrust face to said supports and each strut being bowed in a region located a substantial distance inwardly from its point of juncture with the skirt, the diverging arrangement of the struts permitting a predetermined control of the skirt diameter as a consequence of a toggle action exerted by the struts tending to draw the thrust faces inwardly when said bosses tend to move apart upon thermal expansion of the head, and the bowing of said struts providing sufficient flexibility so that under conditions of excessive heating of the piston when the skirt diameter is not controlled as a result of said toggle action the struts will flex upon expansion of said thrust faces against the cylinder wall.

3. A piston according to claim 1 in which a part of each of the struts extends at an angle of less than forty degress with the axis of the piston pin bosses.

4. A piston for use in an engine cylinder comprising a head, two boss carrying supports extending downwardly from opposite sides of said head, coaxial piston pin bosses carried by said supports, a skirt constructed to form arcuate thrust faces at opposite sides of the piston between said boss carrying supports, a pair of struts connecting a thrust face with said supports and extending in diverging relation from the skirt to said supports, each strut being bowed throughout the major portion of its breadth, the diverging arrangement of the struts permitting a predetermined control of the skirt diameter as a consequence of a toggle action exerted by the struts tending to draw the thrust faces inwardly when said bosses tend to move apart upon thermal expansion of the head, and the angularity and bowing of said struts providing sufficient flexibility so that upon failure of said struts to control the skirt diameter such as by reason of excessive heating of the piston said struts will flex upon expansion of said skirt against the cylinder wall.

RAY E. DAY.